(12) United States Patent
Ishimitsu et al.

(10) Patent No.: US 7,290,518 B2
(45) Date of Patent: Nov. 6, 2007

(54) PISTON-CONNECTING ROD SPHERICAL COUPLING STRUCTURE

(75) Inventors: Kengo Ishimitsu, Wako (JP); Keisuke Takaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 11/389,091

(22) Filed: Mar. 27, 2006

(65) Prior Publication Data

US 2006/0213479 A1 Sep. 28, 2006

(30) Foreign Application Priority Data

Mar. 28, 2005 (JP) ............................ P2005-092799
Mar. 28, 2005 (JP) ............................ P2005-092821

(51) Int. Cl.
*F02B 75/32* (2006.01)
*F02F 3/00* (2006.01)
*F16C 7/00* (2006.01)

(52) U.S. Cl. ............................. 123/197.1; 123/197.4; 123/197.3; 123/193.6

(58) Field of Classification Search ............ 123/197.1, 123/197.4, 197.3, 193.6; 74/579 E, 579 R, 74/587; 92/165 PR, 187, 189

See application file for complete search history.

(56) References Cited

U.S. PATENT DOCUMENTS

| 5,146,883 | A | * | 9/1992 | Reipert et al. ........... 123/193.6 |
| 5,669,285 | A | * | 9/1997 | Wiczynski et al. ........... 92/157 |
| 5,685,267 | A | * | 11/1997 | Wiczynski et al. ...... 123/197.3 |
| 7,127,981 | B2 | * | 10/2006 | Endoh et al. ........... 92/165 PR |

FOREIGN PATENT DOCUMENTS

JP          3-17369 U          2/1991

* cited by examiner

*Primary Examiner*—Stephen K. Cronin
*Assistant Examiner*—Hyder Ali
(74) *Attorney, Agent, or Firm*—Birch, Stewart, Kolasch & Birch, LLP

(57) ABSTRACT

A spherical coupling structure for a piston and a connecting rod, wherein a protrusion provided to the reverse side of a crown of a piston and a holding member for holding a small end are slidably fitted onto a small end, and a holding/fastening part for holding the protrusion and the holding member is screwed in. The piston is composed of an upper piston that includes the protrusion and a lower piston that includes the holding/fastening part. The masses of the upper piston and lower piston are distributed so as to substantially match each other.

6 Claims, 12 Drawing Sheets

(EMBODIMENT)

(Comp. Ex.)

(EMBODIMENT)

(Comp. Ex.)

PISTON-CONNECTING ROD SPHERICAL COUPLING STRUCTURE

FIELD OF THE INVENTION

The present invention relates to a spherical coupling structure for coupling a piston and a connecting rod by using a spherical joint.

BACKGROUND OF THE INVENTION

One example of a conventional spherical coupling structure for a piston and a connecting rod is a structure wherein a spherical joint is configured by screwing together the side of a piston and the side of a coupling rod by using a fastening member, such as is shown in FIG. 10 hereof. Another example that uses a spherical joint as a coupling structure for a piston and a connecting rod is proposed in Japanese Utility Model Laid-Open Publication No. HEI-3-17369. This spherical coupling structure is described with reference to FIG. 11.

FIG. 10 shows a case in which a cup-shaped supporting unit 202 as a protruding unit is formed on the reverse side of the crown 201 of a piston 200; a downward-facing concavity 203, a concave semispherical surface 204, and a female screw 206 are formed in the cup-shaped supporting unit 202; the top half of the small end 208 of a connecting rod 207 is slidably fitted into the concave semispherical surface 204; concave spherical surfaces 212, 212 formed in a holder 211 are slidably fitted into the lower half of the small end 208; and a male screw 214 formed in a fastening member 213 is screwed into the aforementioned female screw 206, whereby the holder 211 is fixed in place in the cup-shaped supporting unit 202, coupling the piston 200 and the connecting rod 207 together.

FIG. 11 shows a case in which a semispherical concavity 221 is formed in the reverse side of the crown of a piston 220, the substantially spherical small end 223 of a rod 222 is fitted into the concavity 221, and a flange 224 for holding the small end 223 is mounted on the surface surrounding the concavity 221 by using a plurality of bolts 226, whereby the piston 220 and the rod 222 are coupled together.

FIG. 12 shows the relationship between the crank angle and the force acting on a piston 181 in an internal-combustion engine. The vertical axis indicates explosive force EF and kinetic force KF (*1) as forces that act on the piston, and the horizontal axis indicates the crank angle (−360° to 360°).

The explosive force EF shown by the dashed line is calculated based on the internal pressure of the combustion chamber of the internal-combustion engine. The explosive force reaches a maximum immediately after the crank angle 0° (explosive top dead center) at which the internal pressure of the combustion chamber reaches a maximum, and since the explosive force EF is always positive, this force constantly acts on the piston 181 in a direction from the top dead center side to the bottom dead center side (this direction is referred to as downward; likewise hereinbelow).

The kinetic force KF shown by the solid line is calculated from the mass of the piston 181, the engine speed, the stroke length of the piston 181, and the length of the connecting rod 182. The kinetic force is negative near a crank angle of 0° (and ±360°), and therefore a kinetic force KF1 acts on the piston 181 in the direction from the bottom dead center side toward the top dead center side (this direction is referred to as upward; likewise hereinbelow). The kinetic force is positive near a crank angle of ±180° (bottom dead center), and therefore a downward kinetic force KF2 acts on the piston 181.

FIG. 13 shows the relationship between the crank angle in an internal-combustion engine and the force acting on the piston 181. The vertical axis indicates forces that act on the piston 181, which are the kinetic force KF shown in FIG. 12, and the resultant force RF of the explosive force EF shown in FIG. 12 and the kinetic force KF shown in FIG. 12. The horizontal axis indicates the crank angle (−360° to 360°).

The resultant force RF of the explosive force and the kinetic force is positive at crank angles of about −300° to 300°, and the resultant force RF acts downward on the piston 181 at such angles. The resultant force RF is negative at crank angles of about −360° to −300°, and also about 300° to 360°, and the resultant force RF acts upward on the piston 181 at such angles. The resultant force in this range reaches a minimum at ±360°.

In addition to the direction of the resultant force RF of the explosive force and the kinetic force described above, the movement direction of the piston 181 and the direction of the kinetic force are also shown as crank angle ranges (1) through (8). The solid arrows indicate the resultant force RF, the dashed arrows indicate the movement direction of the piston 181, and the bold line arrows indicate the direction of kinetic force KF.

For example, in the crank angle range (1), the movement direction of the piston 181 is downward, the direction of the resultant force RF is upward, and the direction of the kinetic force KF is upward.

In FIGS. 10 and 13, when the piston 200 moves within the cylinder, kinetic force acts on the piston 200, the holder 211, and the fastening member 213.

(A) For example, in the crank angle range (1) and the crank angle range (8) of the piston 200, the respective upward resultant forces RF1 and RF2 act on the piston 200, or, specifically, the upward resultant force RF1 or RF2 acts on the screw joint between the male screw 214 and the female screw 206, creating tensile stress. At this time, a large portion of the resultant force RF1 or the resultant force RF2 is kinetic force KF, and a large portion of the kinetic force KF depends on the mass of the piston 200 above the screw joint between the male screw 214 and the female screw 206. Therefore, a large amount of tensile stress is created in the screw joint because of such a large mass.

(B) Also, for example, in the crank angle ranges (2), (3), (6), and (7) of the piston 200, the respective downward kinetic forces KF3, KF4, KF5, and KF6 act on the piston 200, or, specifically, on the screw joint between the male screw 214 and the female screw 206. These kinetic forces KF3, KF4, KF5, and KF6 depend on the mass of the holder 211 and the fastening member 213, and since the mass of the holder 211 and the fastening member 213 is small, the tensile stress created in the screw joint is also small.

As described above, since tensile stress in the examples (A) and (B) repeatedly acts on the screw joint between the male screw 214 and the female screw 206, there are still the problems of increased average stress in the screw joint and decreased durability of the screw joint.

In FIG. 11, stress is repeatedly created in the screw joint between the bolt 226 and the female screw 227 either (C) by the kinetic force resulting from the mass of the piston 220, or (D) by the kinetic force resulting from part of the mass of the flange 224 and the bolt 226. Since the mass of the piston 220 is greater than the mass of the flange 224, the stress created in (C) is greater than the stress created in (D), the average stress is greater, and the durability of the screw joint between the bolt 226 and the female screw 227 is lowered.

Furthermore, in FIG. 10, for example, depending on the machining precision of the concave semispherical surface 204 in the piston 200 and the female screw 206, misalignment may occur between a center line 217 that passes through the center of the concave semispherical surface 204 and that is perpendicular to the crown 216, and the axis line 218 of the female screw 206, and it may prove difficult to fasten the fastening member 213. Improving the machining precision causes costs to increase.

Also, even if there is virtually no misalignment between the center line 217 and the axis line 218, for example, cases may occur in which the holder 211 is mounted in the downward concavity 203 near the end as a result of fastening the fastening member 213; part of the spherical surfaces 212, 212 of the holder 211 comes into close local contact with the lower half of the small end 208 of the connecting rod 207; the gaps between the small end 208 and the concave semispherical surface 204 and spherical surfaces 212, 212 become nonuniform; and the oil film is not formed uniformly.

In FIG. 11, for example, there may be cases wherein the bolts 226, 226 are fastened and the piston 220 is mounted in the flange 224; the flange 224 moves a great distance from a specific position and part of the flange 224 comes into close local contact with the small end 223 of the connecting rod 222; and it is difficult to form an oil film between the small end 223 and the flange 224.

Also, when the piston 220 and the connecting rod 222 are connected by this type of spherical coupling structure, the temperature of the connecting part between the piston 220 and the connecting rod 222 rises and it becomes even more difficult to form an oil film on the connecting part when the connecting part is positioned in the middle of the piston 220 and the concavity 221 is positioned nearer to the combustion chamber.

SUMMARY OF THE INVENTION

According to one aspect of the present invention, there is provided a spherical coupling structure for a piston and a connecting rod, used in an internal-combustion engine, which comprises: a protrusion formed on the reverse side of a crown of the piston and having a bottom surface on which a concave first spherical surface is formed; a spherical small end formed on the connecting rod and fitted in the first spherical surface so that the distal end is capable of sliding; a holding member having a concave second spherical surface and holding the small end by slidably fitting the portion of the small end that faces the large end in the second spherical surface; a first screw formed on the protrusion; and a second screw formed on a holding/fastening part for holding the holding member, wherein the small end is held by the first spherical surface and the second spherical surface by screwing in the first screw and the second screw, and the piston is comprised of an upper piston that includes the protrusion and a lower piston that includes the holding/fastening part, and the masses of the upper piston and the lower piston are distributed so as to substantially match each other.

Since the piston is thus comprised of an upper piston and a lower piston and the masses of the upper piston and lower piston are distributed so as to substantially match each other, the difference between the kinetic forces acting on the upper piston and the lower piston can be reduced, and the average stress created in the screw joint between the first screw and the second screw can also be reduced. Therefore, the durability against wear on the screw joint can be improved.

Preferably, the center of the small end substantially coincides with the centroid of the piston. The inertial moment of the piston around the small end of the connecting rod can thereby be reduced, and the impact of the piston oscillating and colliding with the cylinder wall can be reduced. Slapping sounds or other types of piston slapping can therefore be reduced.

It is preferred that the lower piston has a skirt part formed around the periphery. The result of the lower piston having this skirt part formed around the periphery is that it is possible for a low-rigidity skirt part to alleviate the impact of collision with the cylinder wall when the piston moves in a direction orthogonal to the thrust/reverse thrust direction, and piston slapping can be reduced. Also, since the skirt part is disposed around the entire periphery, heat is evenly transferred from the crown side of the piston to all parts of the skirt, and the thermal deformation of the skirt part can be made uniform. Therefore, the contact between the skirt part and the cylinder wall can be made uniform around the entire periphery, burn-ins can be prevented, and friction can be reduced.

According to another aspect of the present invention, there is provided a spherical coupling structure for a piston and a connecting rod, used in an internal-combustion engine, which comprises: a protrusion formed on the reverse side of a crown of the piston and having a bottom surface on which a concave first spherical surface is formed; a spherical small end formed on the connecting rod and fitted in the first spherical surface so that the distal end is capable of sliding; a holding member having a concave second spherical surface and holding the small end by slidably fitting the portion of the small end that faces the large end in the second spherical surface; a first screw formed on the protrusion; and a second screw formed on a holding/fastening part for holding the holding member, wherein the small end is held by the first spherical surface and the second spherical surface by screwing in the first screw and the second screw, the protrusion includes a position-adjustable member whose position can be adjusted within a position-adjusting space formed on the inner side, and the first spherical surface is formed in the position-adjustable member.

Since the first spherical surface is thus formed in the position-adjustable member, the position of the first spherical surface can be adjusted, and therefore the first spherical surface and the second spherical surface can be made to be self-aligning, the gaps between the small end and the first and second spherical surfaces can be made uniform, and a more uniform oil film can be formed.

Also, the holding/fastening part can be easily fastened onto the protrusion, operability can be improved, and costs can be reduced because the protrusion and the holding/fastening part do not need to be machined with high precision.

Furthermore, since the position-adjustable member and the protrusion provided to the reverse side of the crown of the piston are separated, heat from the piston crown is not easily transferred to the position-adjustable member, thermal deformation in the first spherical surface and tearing in the oil film can be suppressed, and abrasion between the first spherical surface and the sliding area on the distal end side of the small end of the connecting rod can be reduced.

Preferably, the piston is divided into an upper piston that includes the protrusion and a lower piston that includes the holding/fastening part.

As a result, the transfer of heat from the upper piston to the lower piston can be suppressed; the clearance between the lower piston and the cylinder wall can be reduced because thermal deformation and thermal expansion in the lower piston, and particularly in the skirt part, are reduced; and slapping movements such as oscillation and translational motion in the piston are reduced, allowing piston slapping to be suppressed.

The upper piston and lower piston may be made from separate materials, and since the upper piston can be made from a material with better heat resistance than the lower piston, for example, costs can be reduced more than if the entire piston was made from one material with good heat resistance.

It is preferable that at least one of the position-adjustable member and the holding member be made of ceramics.

The use of ceramics allows abrasion resistance and heat resistance to be improved, and the durability of the piston to be increased.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
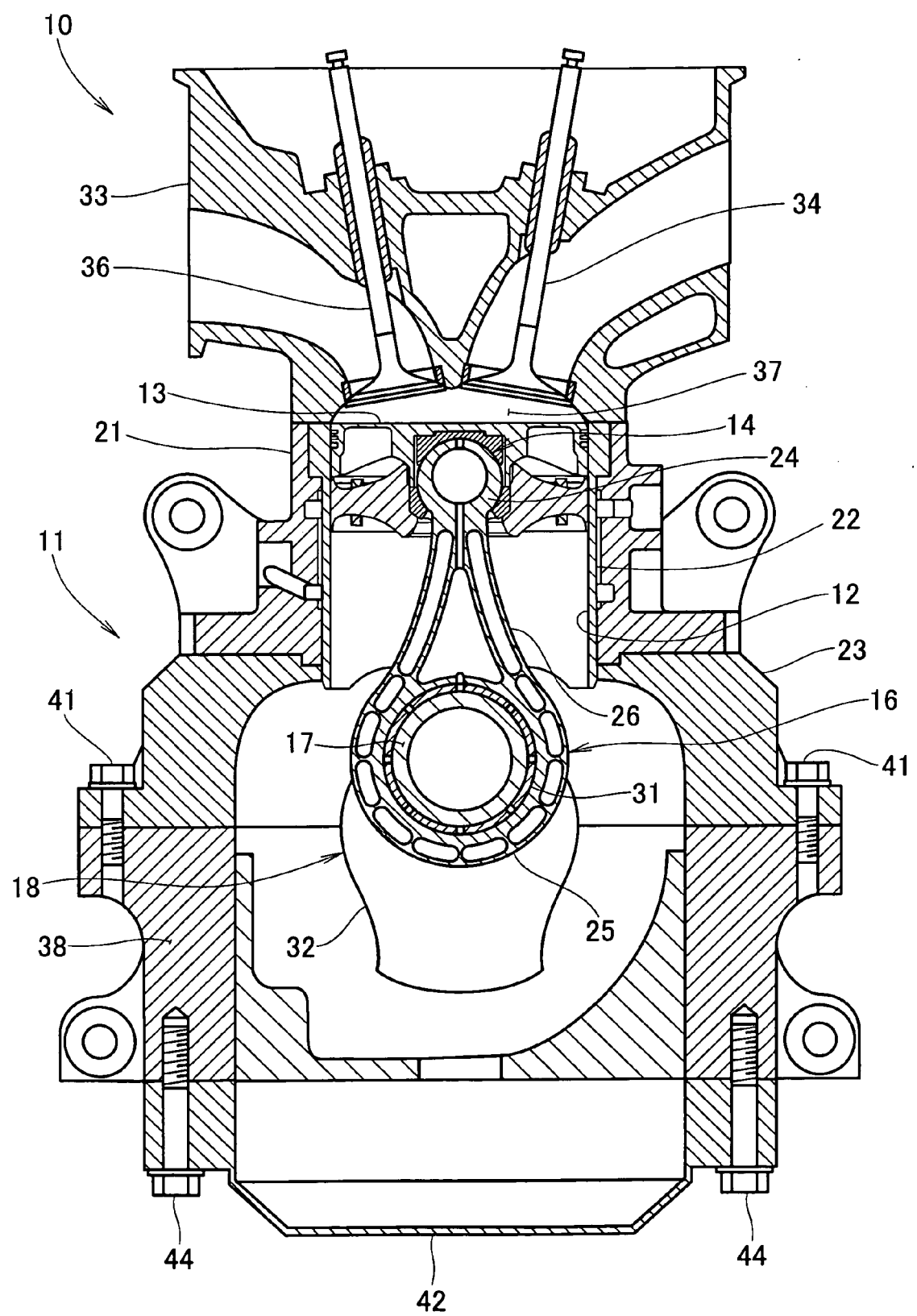
FIG. 1 is a cross-sectional view of an internal-combustion engine employing the piston-connecting rod spherical coupling structure according to the present invention.

As shown in FIG. 1, an internal-combustion engine 10 includes a cylinder block 11, a piston 13 movably inserted into a cylinder bore 12 provided to the cylinder block 11, a connecting rod 16 coupled with the piston 13 via a spherical joint 14, and an assembled crankshaft 18 that is rotatably mounted on the bottom of the cylinder block 11, and that supports the connecting rod 16 with a hollow crank pin 17 in a manner that allows the rod to swing.

The cylinder block 11 is composed of a cylinder part 21 provided to the top, a cylindrical sleeve 22 that is fitted on the inside of the cylinder part 21 and that has the cylinder bore 12 formed therein, and an upper crank case 23 mounted on the bottom of the cylinder part 21.

The connecting rod 16 is a member formed by integrally molding together a spherical small end 24 that is coupled with the piston 13, a large end 25 that is coupled with the crank pin 17, and a rod part 26 for coupling the small end 24 and the large end 25 together. The large end 25 is coupled with the crank pin 17 via a sliding bearing 31.

The reference numeral 32 indicates a counterweight provided to the crankshaft 18, the reference numeral 33 indicates a cylinder head mounted on the top of the cylinder block 11 via a head gasket (not shown), the reference numeral 34 indicates an air intake valve, the reference numeral 36 indicates an exhaust valve, the reference numeral 37 indicates a fuel combustion chamber, the reference numeral 38 indicates a lower crank case mounted on the bottom of the upper crank case 23 by a plurality of bolts 41 to form a crank case with the upper crank case 23, and the reference numeral 42 indicates an oil pan mounted on the bottom of the lower crank case 38 by a plurality of bolts 44.

Figure 2:
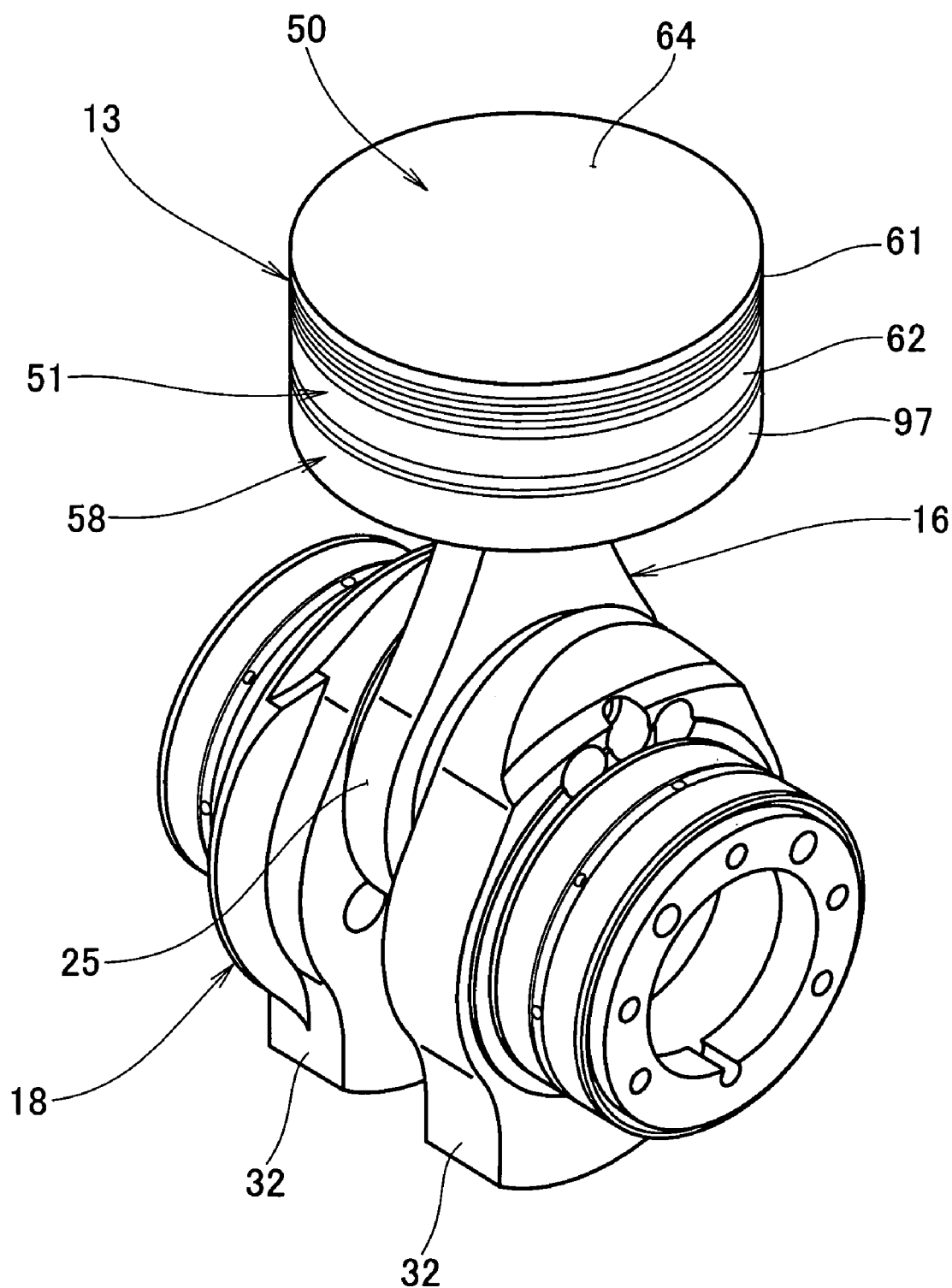
FIG. 2 is a perspective view showing a manner in which the piston, the connecting rod, and a crankshaft are assembled.

FIG. 2 shows a case in which the connecting rod 16 is swingably mounted on the piston 13, and the connecting rod 16 is also swingably mounted on the crankshaft 18.

The connecting rod 16 (*2) is manufactured by casting the material AC8A (JIS H 5202), for example, and is mechanically worked after undergoing a T6 treatment as a heat treatment.

Chrome steel, chrome molybdenum steel, and titanium alloys are suitable examples of the material for the connecting rod 16.

Figure 3:
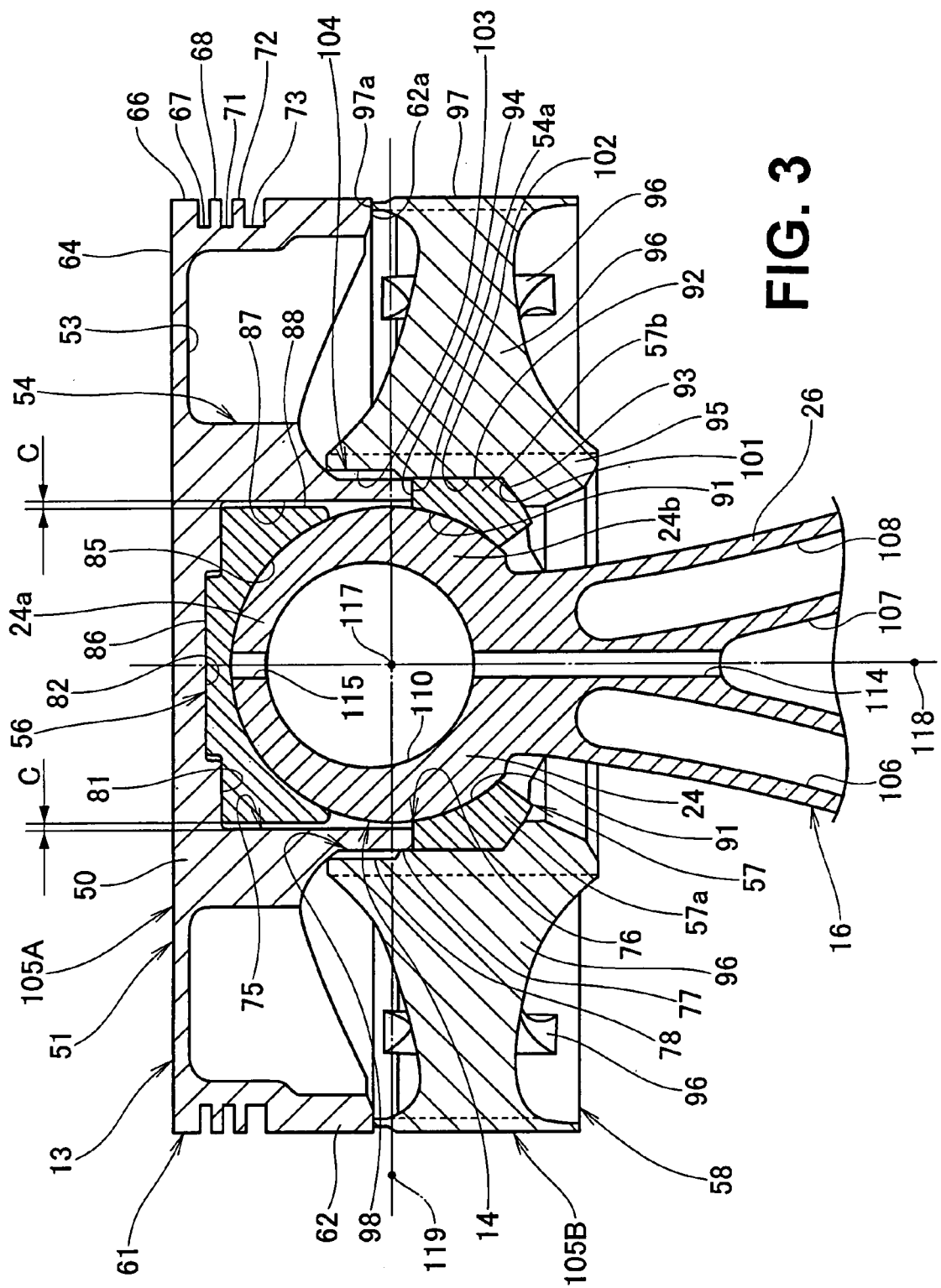
FIG. 3 is a cross-sectional view of the piston and the connection rod.

As shown in FIG. 3, the piston 13 is composed of an upper piston 51, including a crown 50 that forms a combustion chamber 37 (see FIG. 1), an upper holding member 56 disposed inside a protrusion 54 that protrudes from the reverse side 53 of the crown 50 of the upper piston 51 to slidably hold the upper semispherical part 24a of the small end 24 of the connecting rod 16, a lower holding member 57 for slidably holding the lower semispherical part 24b of the small end 24 of the connecting rod 16, and a lower piston 58 screwed together with the upper piston 51 to hold the lower holding member 57.

The upper piston 51 is a member formed by integrally molding together the crown 50, which is in the shape of a circular plate; a land part 61 that has a thick cylindrical shape and extends downward from the edge of the crown 50; an upper skirt part 62 that has a cylindrical shape extending further downward from the land part 61 and that is thicker than the land part 61; and the protrusion 54 previously described.

The crown 50 includes a crown surface 64 that faces the combustion chamber 37 (see FIG. 1).

The land part 61 is provided with the following components, in the given order beginning from the crown surface 64 side: a top land 66, a top ring groove 67, a second land 68, a second ring groove 71, a third land 72, and an oil ring groove 73; wherein a top ring (not shown) is fitted in the top ring groove 67, a second ring (not shown) is fitted in the second ring groove 71, and an oil ring (not shown) is fitted in the oil ring groove 73.

The protrusion 54 includes a concavity 75 for accommodating the upper holding member 56 in a manner that enables the holding member to move in the radial direction of the piston 13, and a male screw 78 formed on the outer peripheral surface 77 on the side of the opening 76 of the concavity 75. A small concavity 82 is formed in the bottom 81 of the concavity 75.

The upper holding member 56 is made of silicon nitride ceramics, which has excellent heat resistance and abrasion resistance. The holding member includes a first spherical surface 85 as a concave spherical surface that slidably fits over the upper semispherical part 24a of the small end 24 of the connecting rod 16, and a small convexity 86 positioned in the small concavity 82 of the upper piston 51. There are gaps C between the inner peripheral surface 87 of the concavity 75 and the outer peripheral surface 88 of the upper holding member 56 on both sides, and, similarly, there are gaps C (not shown) between the small concavity 82 and the small convexity 86 on both sides. These gaps C are also found on both sides between the inner peripheral surface 87 of the concavity 75 and the small end 24 of the connecting rod 16.

Suitable examples of the aforementioned silicon nitride ceramics include $Si_3N_4$ (silicon nitride), BN (boron nitride), AlN (aluminum nitride), and TiN (titanium nitride).

The lower holding member 57 is made of silicon nitride ceramics (suitable as the lower holding member 57) and is divided into four parts that include a second spherical surface 91 as a concave spherical surface slidably fitted over the lower semispherical part 24b of the small end 24 of the connecting rod 16, an outer peripheral surface 92 and a male tapered part 93 that fit over the lower piston 58, and a contact surface 94 that is in contact with the end surface 54a of the protrusion 54 of the upper piston 51. A rotation-stopping pin (not shown) ensures that the lower holding member does not rotate in relation to the protrusion 54 of the upper piston 51, and the presence of a guided surface that is in contact with the rod part 26 of the connecting rod 16 ensures that the piston 13 does not rotate in relation to the connecting rod 16. The reference numerals 57a through 57d (reference numerals 57c and 57d are not shown) indicate the four segments that constitute the lower holding member 57.

The lower piston 58 is formed by integrally molding a cylindrical part 95 disposed so as to enclose the bottom part of the protrusion 54 of the upper piston 51 and the lower holding member 57, a plurality of ribs 96 extending from the cylindrical part 95 in a radial pattern, and a cylindrical lower skirt part 97 coupled with the distal ends of the ribs 96, wherein the upper end surface 97a of the lower skirt part 97 provided along the entire periphery is brought into contact with the lower end surface 62a of the upper skirt part 62 of the upper piston 51.

Included in the hole 98 of the cylindrical part 95 includes are a female tapered part 101 that is in close contact with the male tapered part 93 of the lower holding member 57, an inner peripheral surface 102 that is fitted over the outer peripheral surface 92 of the lower holding member 57 with a specific gap, and a female screw 103 formed on the top of the inner peripheral surface 102 for providing threaded coupling with the male screw 78 of the upper piston 51.

Fitting the male tapered part 93 and the female tapered part 101 together makes it possible for the axis line of the lower holding member 57 to coincide with the axis line of the cylindrical part 95.

The male screw 78 of the upper piston 51 and the female screw 103 of the lower piston 58 described above constitute a threaded coupling 104.

The upper piston 51 and the lower piston 58 have substantially the same masses, and the upper holding member 56 and lower holding member 57 also have substantially the same masses. Therefore, the mass of the upper piston half 105A composed of the upper piston 51 and the upper holding member 56 is substantially the same as the mass of the lower piston half 105B composed of the lower piston 58 and the lower holding member 57.

The connecting rod 16 has hollow parts 106, 107, 108, and 110 inside the rod part 26 to reduce weight. The hollow part 110 for reducing weight is disposed inside the small end 24. The rod also has oil holes 114 and 115 for supplying oil to the sliding surface of the spherical joint 14 from the side of the large end 25 (see FIG. 1).

The aforementioned protrusion 54, the upper holding member 56, the lower holding member 57, the cylindrical part 95, and the small end 24 constitute the spherical joint 14 described above.

The reference numeral 117 indicates a center point that represents the center of the spherical small end 24, and is also the centroid of the piston 13. It is also acceptable for the center point 117 to merely substantially coincide with the centroid of the piston 13.

The reference numeral 118 indicates the axis line of the piston 13. The reference numeral 119 indicates a straight line that passes through the center point 117 and that lies in a plane orthogonal to the axis line 118.

Figure 4:
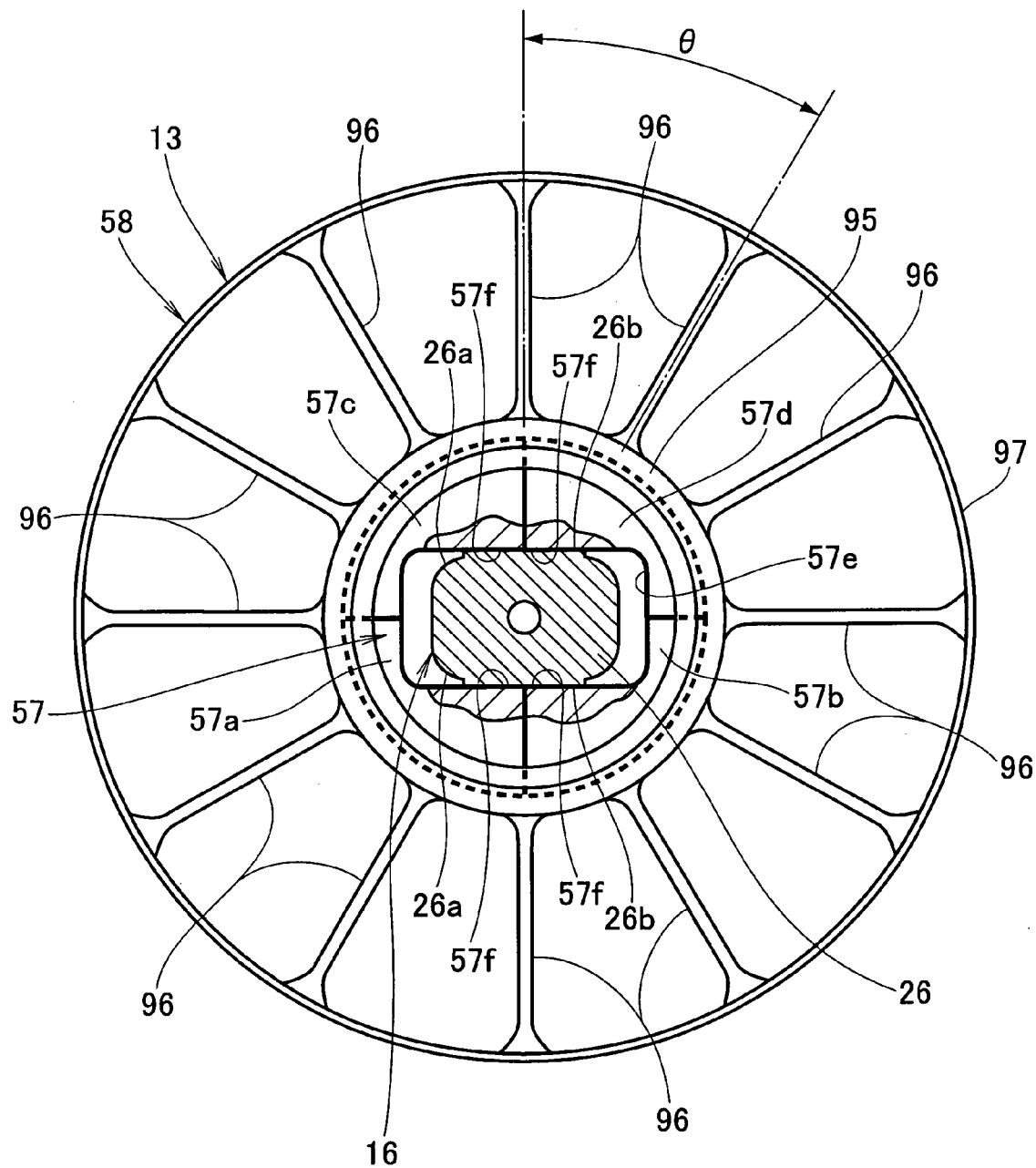
FIG. 4 is a bottom side view showing the piston and the connection rod.

As shown in FIG. 4, the lower piston 58 includes a plurality of ribs 96 for linking the cylindrical part 95 to the lower skirt part 97. All the angles θ formed by adjacent ribs 96 are equal to each other in this case. This option is nonlimiting, however, and the angles formed by adjacent ribs 96 may be different between the thrust side and the reverse thrust side, or they may be different between the front and rear sides in a direction orthogonal to the thrust-reverse thrust direction; for example, in the front-rear direction in an internal-combustion engine in which the crankshaft extends from the front to the back of the vehicle. Components equivalent to these ribs 96 may be provided to the upper piston 51 (see FIG. 3), whereby the stress created in the crown 50 (see FIG. 3) of the upper piston 51 can be distributed equally among the ribs, and the maximum value of the stress created in the upper piston 51 can be reduced.

The connecting rod 16 has guiding surfaces 26b, 26b that are flat and are parallel to the swinging (oscillating) direction (left and right direction in the diagram) of the connecting rod 16. The guiding surfaces are formed on the side surfaces 26a, 26a of the rod part 26 adjacent to the small end 24 (see FIG. 3). The lower holding member 57 (the member shown in bold lines to accentuate its shape) is provided with guided surfaces 57f for each of the segments 57a through 57d in the rectangular openings 57e provided in order to ensure passage through the connecting rod 16, and these guided surfaces are guided while in contact with the aforementioned guiding surfaces 26b, 26b.

As described above, forming the guiding surfaces 26b, 26b in the connecting rod 16 and forming the guided surfaces 57f, 57f guided by the guiding surfaces 26b, 26b in the lower holding member 57 makes it possible to prevent the connecting rod 16 from rotating around the cylinder axis of the piston 13.

Assembly of the piston 13 and the connecting rod 16 described above is schematically shown in FIGS. 5A, 5B, 6A, 6B, 7A, and 7B.

Figure 5A:
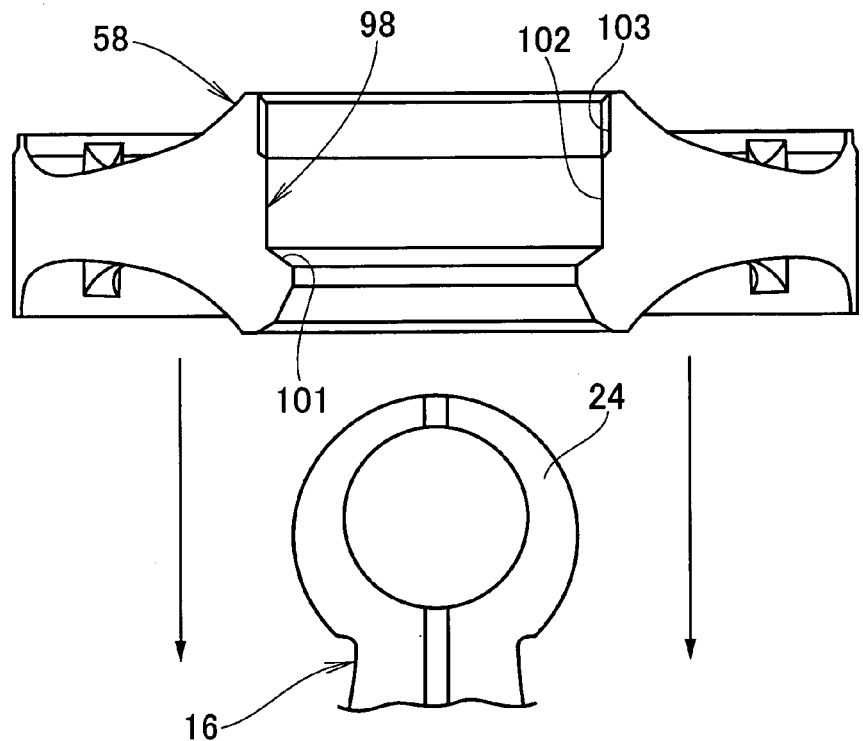
FIG. 5A is an operation diagram showing the manner in which the lower piston is moved to the small end of the connection rod.
Figure 5B:
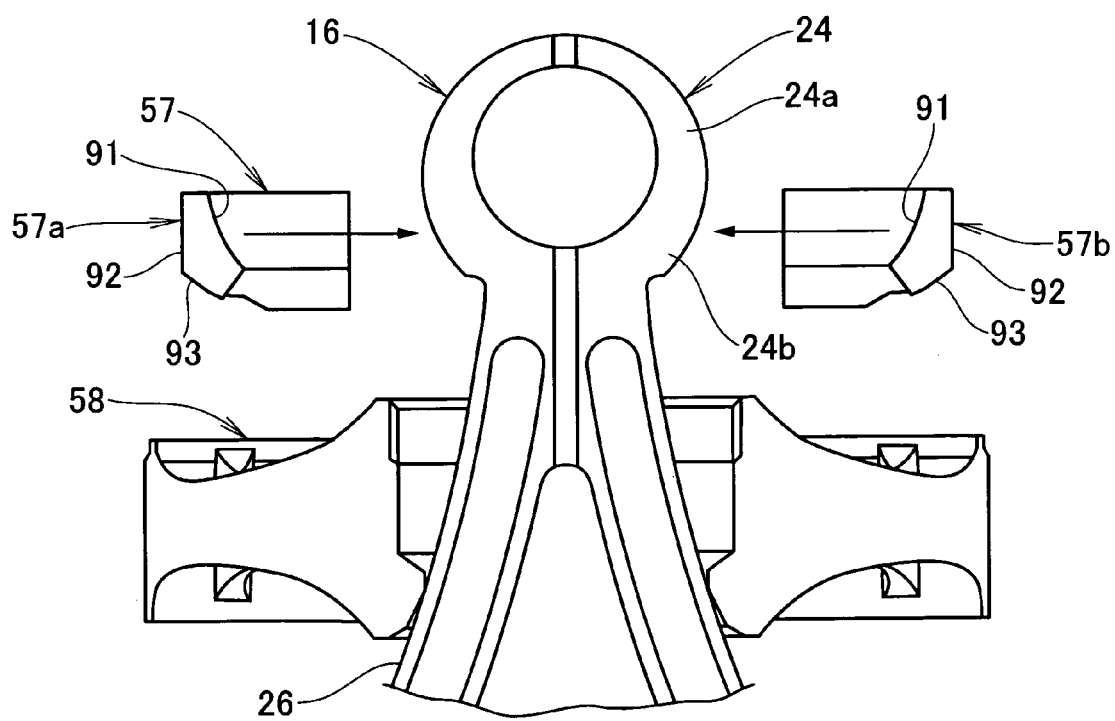
FIG. 5B is an operation diagram showing the manner in which the lower holding member is attached to the small end.

In FIG. 5A, the lower piston 58 is moved in the direction of the arrows so that the small end 24 of the connecting rod 16 enters through the hole 98 of the lower piston 58. As shown in FIG. 5B, the lower piston 58 is separated from the small end 24 and is moved in the direction of the arrows so that the second spherical surfaces 91 of the segments 57a through 57d (only the segments 57a and 57b are shown) of the lower holding member 57 are in close contact with the lower semispherical part 24b of the small end 24.

Figure 6A:
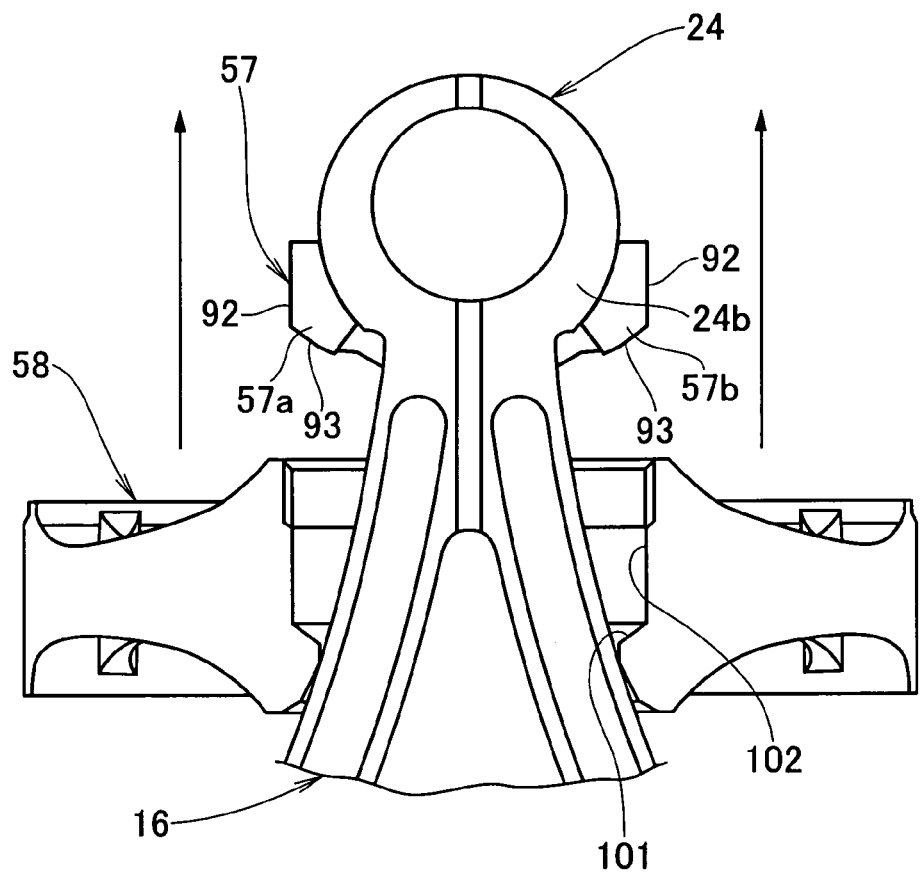
FIG. 6A is an operation diagram showing the manner in which the lower piston is fitted to the lower holding member.

In FIG. 6A, the lower piston 58 is moved in the direction of the arrows while the segments 57a through 57d (only the segments 57a and 57b are shown) of the lower holding member 57 are in close contact with the small end 24. The inner peripheral surface 102 and female tapered part 101 of the lower piston 58 are fitted into the outer peripheral surface 92 and the male tapered part 93 of the lower holding member 57, respectively.

Figure 6B:
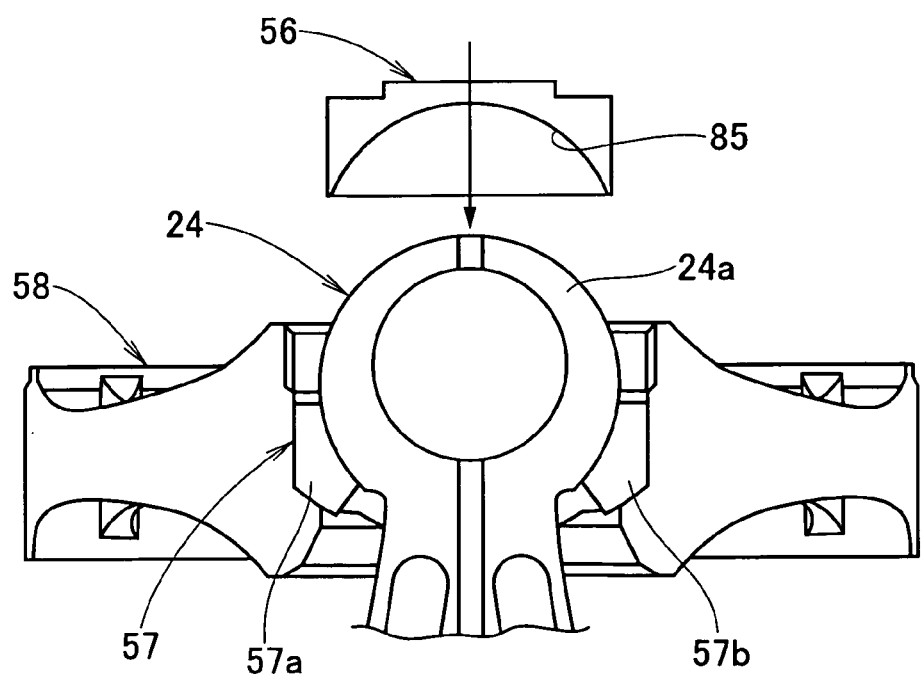
FIG. 6B is an operation diagram showing the manner in which the upper holding member is attached to the small end.

In FIG. 6B, the upper holding member 56 is made to cover the small end 24, as shown by the arrow, and the upper semispherical part 24a of the small end 24 is in close contact with the first spherical surface 85 of the upper holding member 56.

Figure 7A:
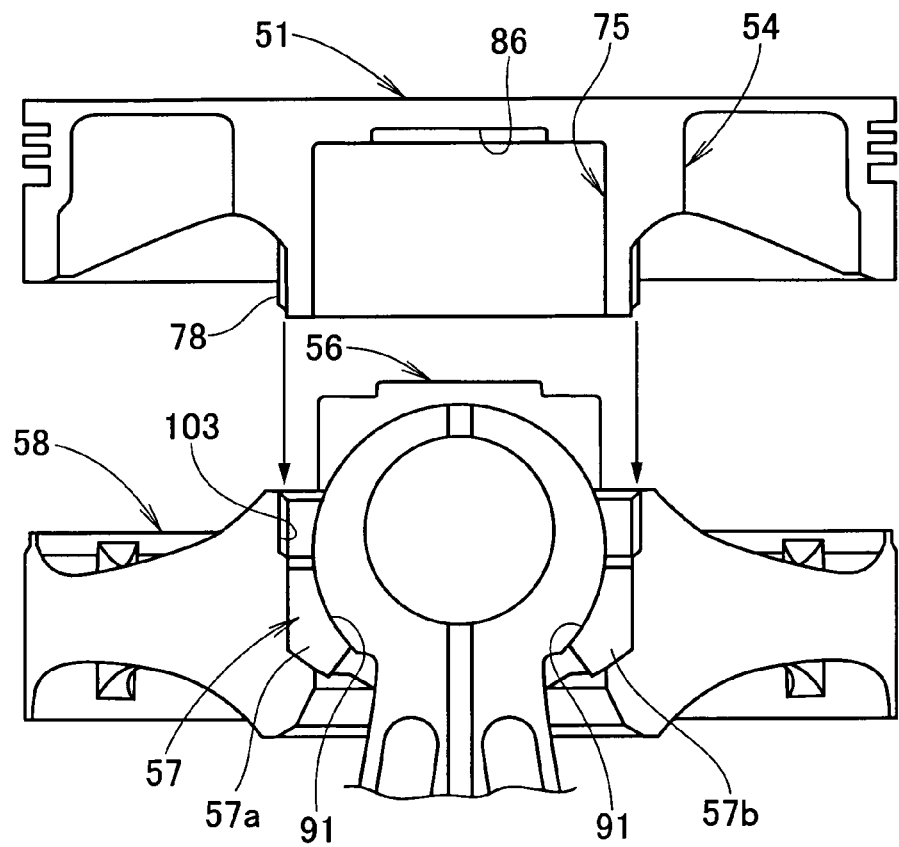
FIG. 7A is an operation diagram showing the manner in which the upper piston is screwed onto the lower piston.

In FIG. 7A, the upper piston 51 is moved in the direction of the arrows so that the upper holding member 56 enters the concavity 75 of the upper piston 51, and the male screw 78 of the upper piston 51 is screwed into the female screw 103 of the lower piston 58.

Figure 7B:
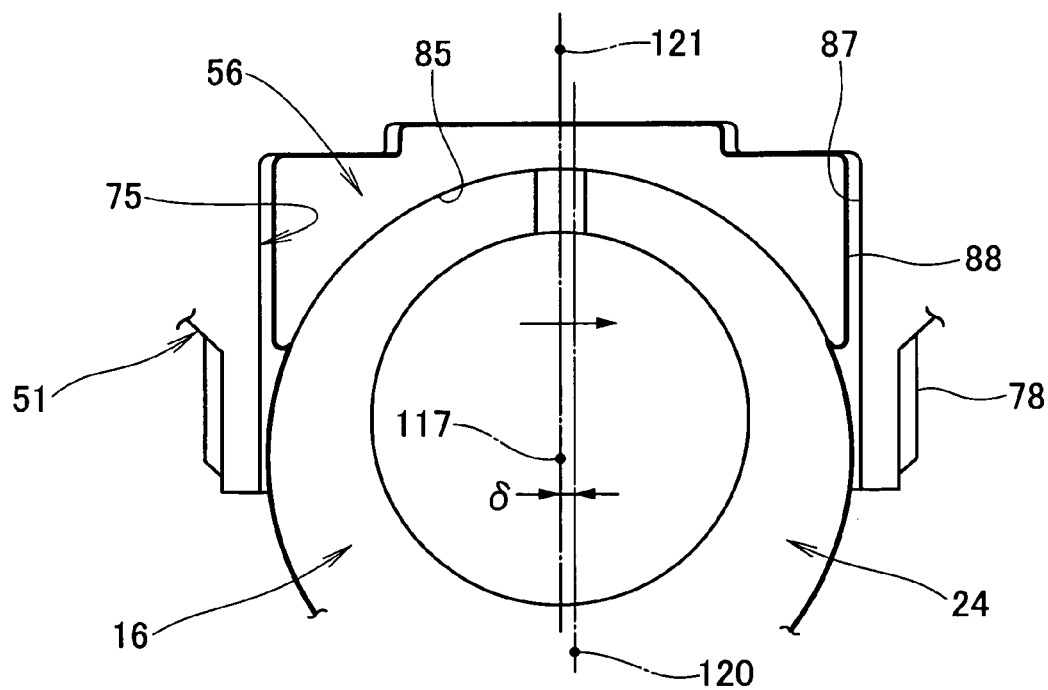
FIG. 7B is an operation diagram showing the upper holding member and the small end in a movable state relative to the upper piston.

At this time, as shown in FIG. 7B, there may, for example, be a misalignment δ between the axis line 120 of the male screw 78 (or the female screw 103 (see FIG. 7A)) and the center line 121 that passes through the center point 117 of the small end 24 of the connecting rod 16 (this center line 121 also passes through the center of the first spherical surface 85 and the second spherical surfaces 91 (see FIG. 7A)). Even in this case, however, the center line 121 can be self-aligned (specifically, the axis line 120 and the center line 121 can be made to coincide) in relation to the axis line 120 by integrally moving the upper holding member 56 and the small end 24 in the direction of the arrows within the concavity 75 of the upper piston 51, the male screw 78 and the female screw 103 can be easily screwed together, and the gaps between the small end 24 and the first spherical surface 85 and second spherical surfaces 91 can be kept more uniform.

Figure 8:
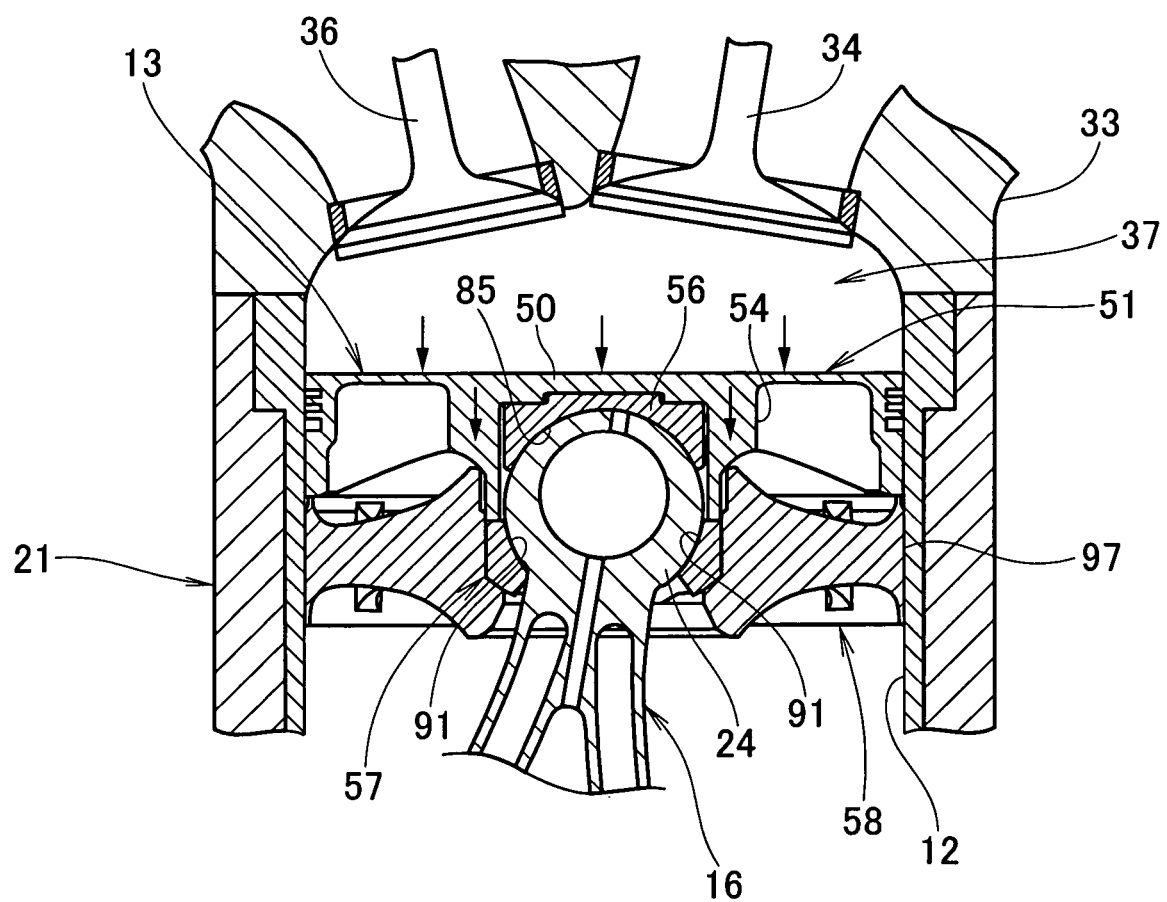
FIG. 8 is an operation diagram showing the transfer of heat in the piston.

As shown in FIG. 8, when the temperature of the crown 50 of the upper piston 51 is increased by the explosion of the fuel-air mixture in the combustion chamber 37, the heat of the crown 50 is transferred to the protrusion 54 as shown by the arrows, but the heat is not easily transferred from the crown 50 to the upper holding member 56 because the upper holding member 56 is separate from the crown 50 and because there is an oil film between the crown 50 and the upper holding member 56. Therefore, it is possible to reduce the temperature of the sliding part between the first spherical surface 85 of the upper holding member 56 and the small end 24 of the connecting rod 16, thermal deformation in the sliding part can be reduced, and the oil film is not likely to tear.

Since the upper piston 51 and the lower piston 58 are separate components, heat is not easily transferred from the upper piston 51 to the lower piston 58, and the temperature of the lower piston 58, that is, the temperature of the lower skirt part 97, can be reduced. Therefore, it is possible to set a smaller gap between the cylinder bore 12 and the lower skirt part 97; to reduce the energy with which the piston 13 collides against the cylinder bore 12 during swinging (oscillation centered around the small end 24), translation (movement in the thrust/reverse thrust direction), or other types of slapping movement, and to inhibit piston slapping.

Figure 9B:
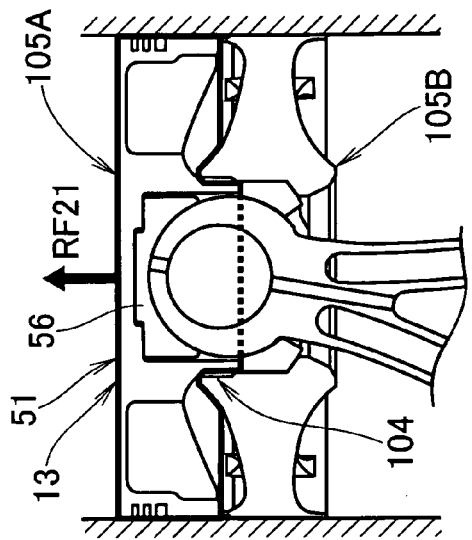
FIG. 9B is an operation diagram showing a state in which upward resultant force acts on an upper piston and an upper holding member in an embodiment.
Figure 9D:
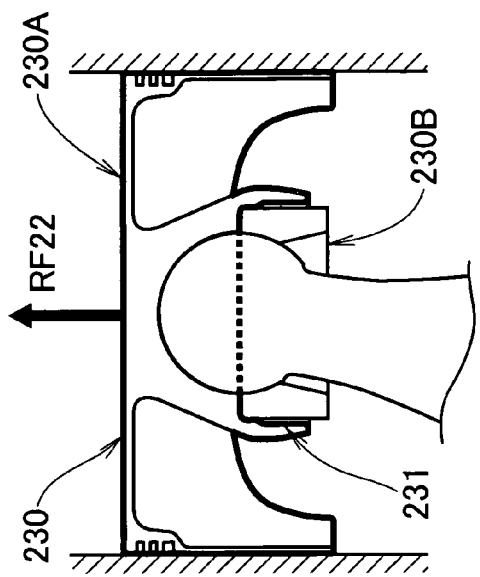
FIG. 9D is an operation diagram showing a state in which upward resultant force acts on the upper piston half in a comparative example.
Figure 9A:
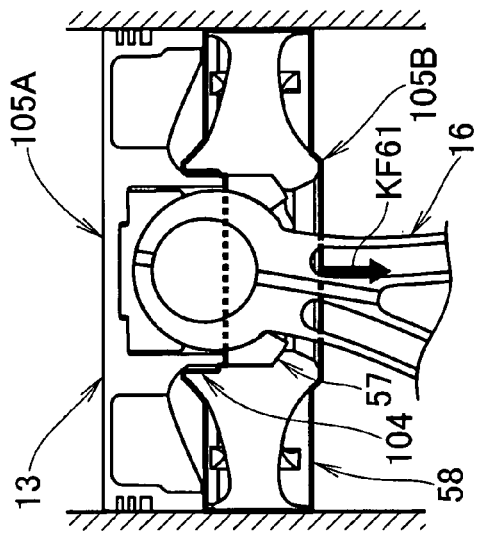
FIG. 9A is an operation diagram showing a state in which downward kinetic force acts on a lower piston and a lower holding member in an embodiment.
Figure 13:
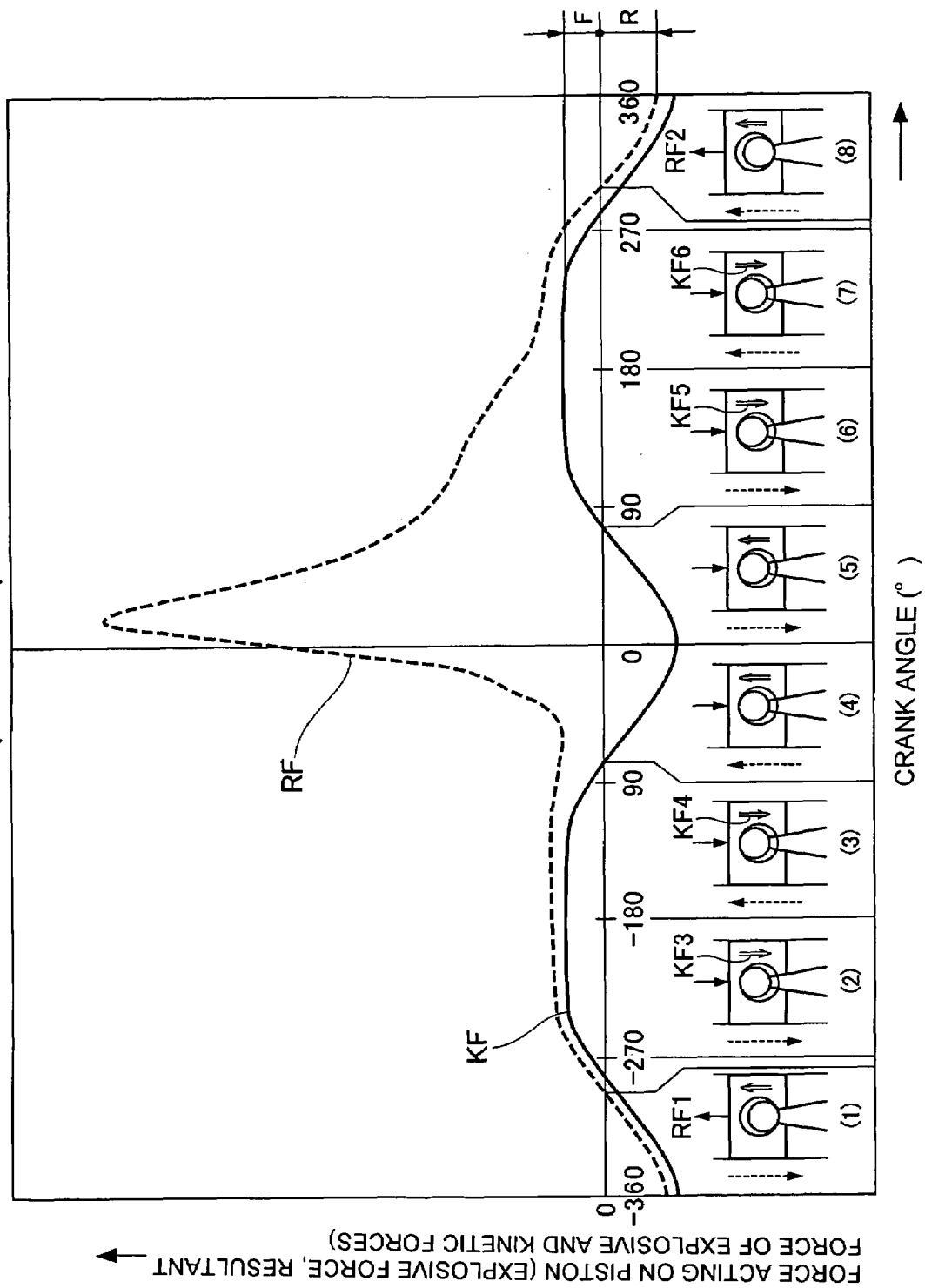
FIG. 13 is a graph showing the relationship of the crank angle to the kinetic force and to the resultant force of the explosive force and kinetic force acting on a piston in an internal-combustion engine.

The embodiment in FIG. 9A shows the force that acts on the piston 13 in the crank angle range (7) shown in FIG. 13. Specifically, when the piston 13 moves upward, a downward kinetic force KF61 acts on the lower piston half 105B (the portion whose contours are drawn in bold lines) composed of the lower piston 58 and the lower holding member 57, and this kinetic force KF61 acts as tensile force on the threaded coupling 104 that has a male screw and a female screw.

The embodiment in FIG. 9B shows the force that acts on the piston 13 in the crank angle range (8) shown in FIG. 13. Specifically, when the piston 13 moves upward, an upward resultant force RF21 acts on the upper piston half 105A (the portion whose contours are drawn in bold lines) composed of the upper piston 51 and the upper holding member 56, and this resultant force RF21 acts as tensile force on the threaded coupling 104 that has a male screw and a female screw.

Figure 12:
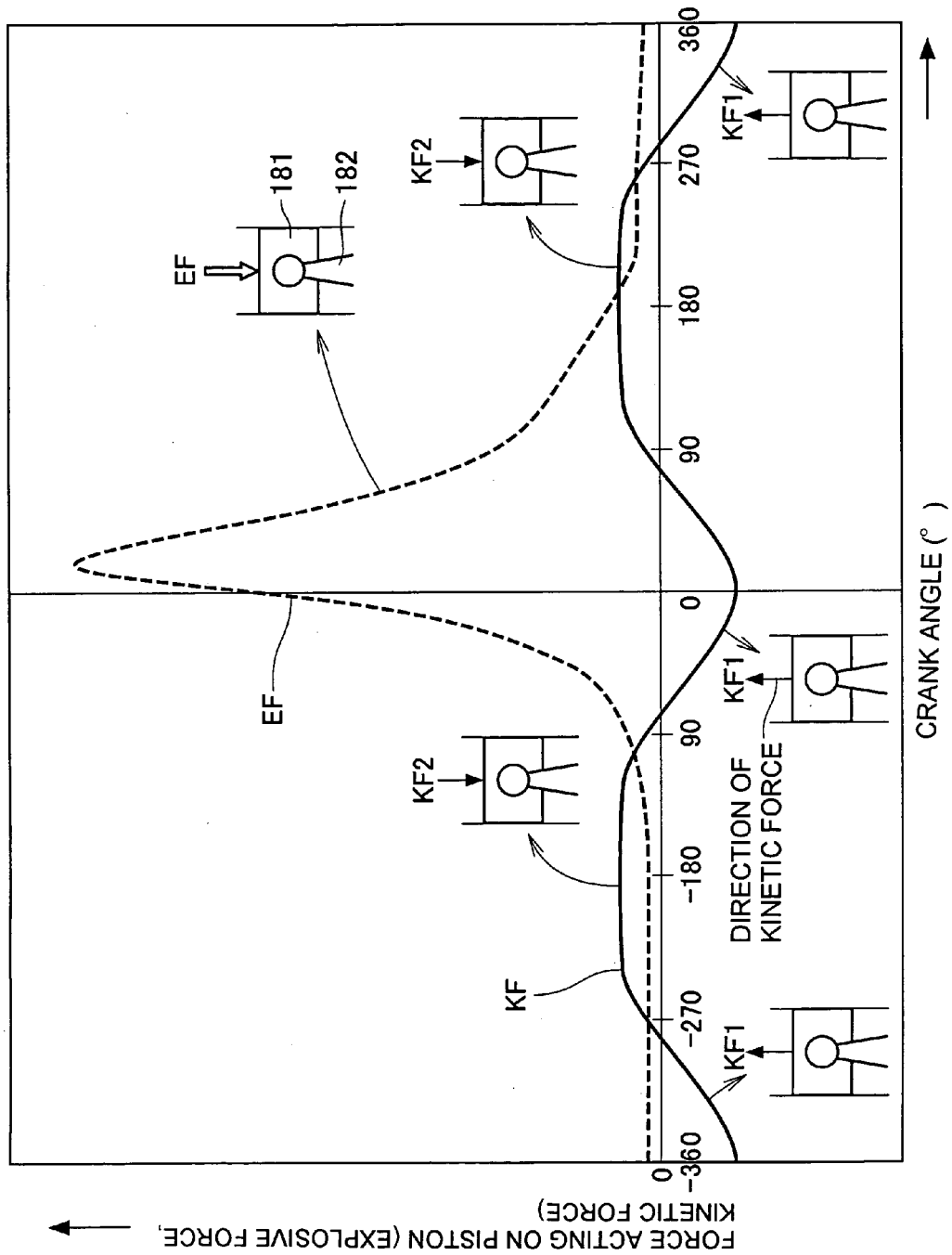
FIG. 12 is a graph showing the relationship of the crank angle to the explosive force and to the kinetic force acting on a piston in an internal-combustion engine.

In FIG. 13, F denotes the maximum value of kinetic force in the crank angle range (7) (this value is also the maximum value in the crank angle range of −360° to 360°), and R denotes the maximum absolute value of resultant force in the crank angle range (8) (this value is also the maximum absolute value on the negative side of the crank angles −360° to 360°), wherein the ratio of F to R is F:R=7:10. This ratio is determined by the kinetic force and the internal pressure of the combustion chamber that act on the piston of the internal-combustion engine shown in FIG. 12.

The result of this is that in the piston 13 of the present invention in FIGS. 9A and 9B, the ratio of the mass MU of the upper piston half 105A to the mass ML of the lower piston half 105B is approximately 1:1, and therefore the ratio of KF61 to RF21 is KF61:RF21=7:10, and the ratio of the stress created by the lower piston half 105B in the threaded coupling 104 to the stress created by the upper piston half 105A in the threaded coupling 104 is also 7:10.

Figure 9C:
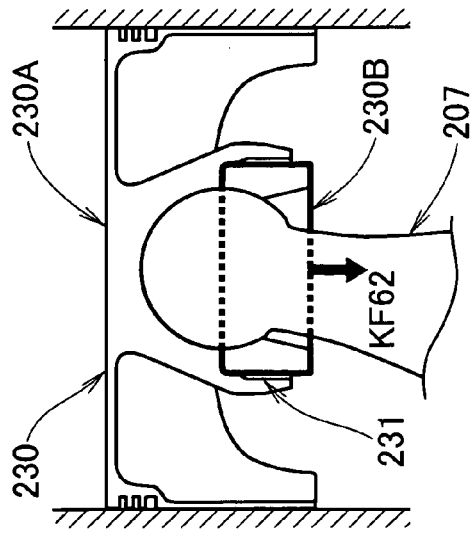
FIG. 9C is an operation diagram showing a state in which downward kinetic force acts on the lower piston half in a comparative example.
Figure 10:
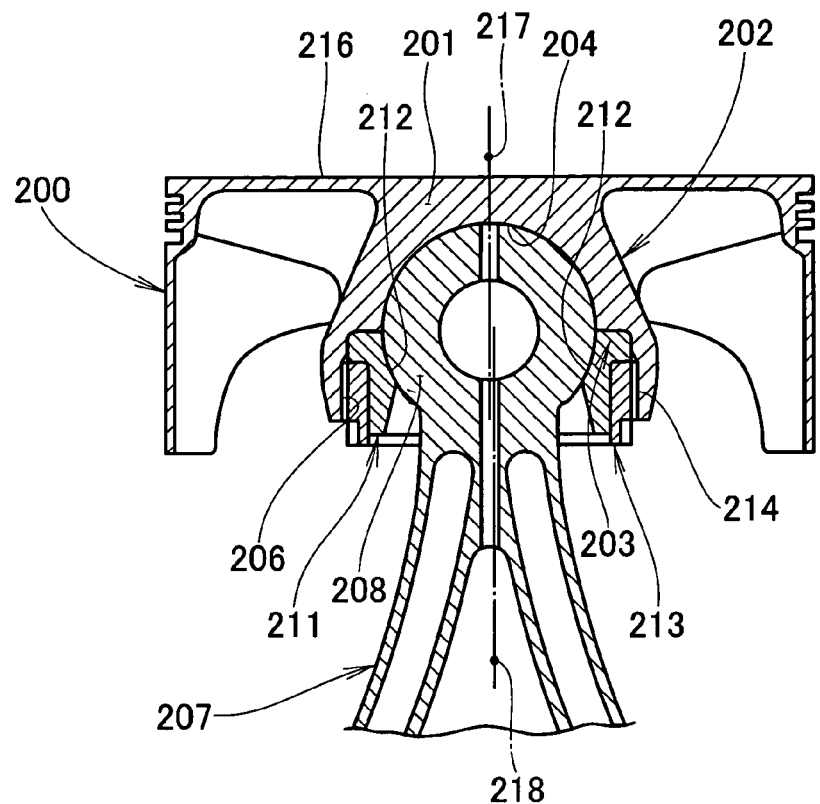
FIG. 10 is a cross-sectional view showing a conventional first spherical coupling structure for a piston and a connecting rod.
Figure 11:
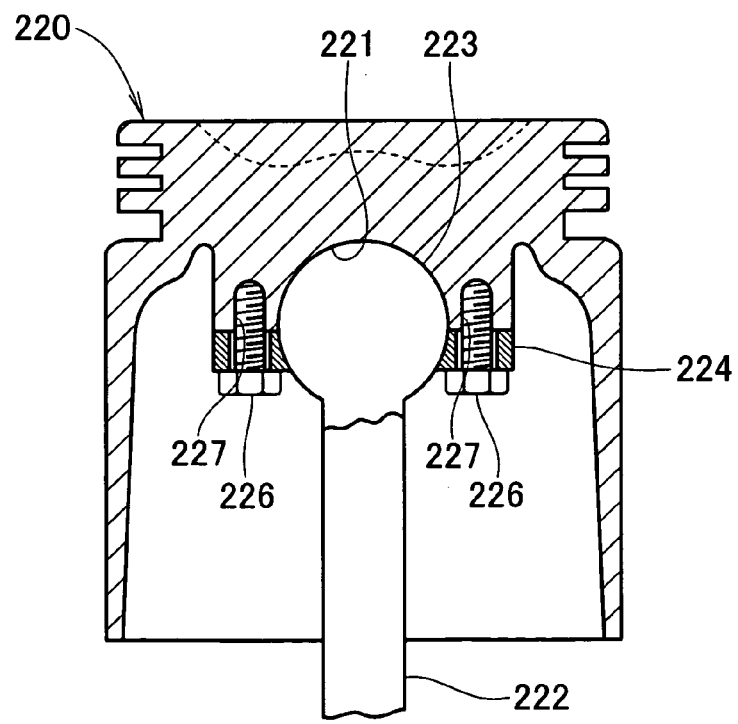
FIG. 11 is a cross-sectional view showing a conventional second spherical coupling structure for a piston and a connecting rod.

The comparative example in FIG. 9C shows the force that acts on a piston 230 (which is equivalent to the piston 200 shown in FIG. 10) in the crank angle range (7) shown in FIG. 13. Specifically, when the piston 230 is moving upward, a downward kinetic force KF62 acts on the lower piston half 230B (the portion whose contours are drawn in bold lines), and this kinetic force KF62 also acts as tensile force on the threaded coupling 231 that has a male screw and a female screw.

The comparative example in FIG. 9D shows the force that acts on the piston 230 in the crank angle range (8) shown in FIG. 13. Specifically, when the piston 230 is moving upward, an upward resultant force RF22 acts on the upper piston half 230A (the portion whose contours are drawn in bold lines), and this resultant force RF22 also acts as tensile force on the threaded coupling 231 that has a male screw and a female screw.

The ratio of the kinetic force F to the resultant force R is F:R=7:10 when, for example, the ratio of the mass CMU of the upper piston half 230A to the mass CML of the lower piston half 230B, both of which are shown in FIGS. 9C and 9D, is CMU:CML=8:2. Therefore, the condition KF62: RF22=7:40 is then true, and the ratio of the stress created by the lower piston half 230B in the threaded coupling 231 to the stress created by the upper piston half 230A in the threaded coupling 231 is also 7:40. Accordingly, the average stress created in the threaded coupling 231 by the upper piston half 230A is greater than the average stress in the threaded coupling 104 of the piston 13 in the embodiment shown in FIGS. 9A and 9B.

Returning to FIG. 3, in order to further reduce the kinetic moment according to the present invention when the piston 13 is oscillating, the centroid of the piston 13 must be made to substantially coincide with the small end 24 of the connecting rod 16, which is the center of oscillation of the piston 13. In order to accomplish this, the mass M1 of the upper piston 51 and the mass M2 of the lower piston 58 are made to be substantially equal, and the position where the upper piston 51 and the lower piston 58 (*3) are divided is brought close to a plane that passes through the center point 117 of the small end 24 and that contains the straight line 119 orthogonal to the axis line 118 of the piston 13.

In the present invention, the masses of the upper piston and the lower piston are distributed so as to substantially match each other, but the present invention is not limited to this option alone, and it is also acceptable for the sum of the masses of the upper piston and the upper holding member 56 shown in FIG. 3 to substantially match the sum of the masses of the lower piston and the holding member (specifically, the lower holding member 57 shown in FIG. 3).

Also, in the present invention, a position-adjusting space was formed inside the protrusion of the upper piston, a position-adjustable member was disposed inside this position-adjusting space to allow positional adjustments to be made, and a first spherical surface was formed on this position-adjustable member, but the present invention is not limited to this option alone, and it is also acceptable to form a position-adjusting space inside the lower piston (specifically, in the portion equivalent to the cylindrical part 95 shown in FIG. 3), to dispose a position-adjustable member (a member equivalent to the lower holding member 57 shown in FIG. 3) in this position-adjusting space to allow its position to be adjusted, and to form a second spherical surface on this position-adjustable member.

Furthermore, in the present embodiment, both the upper holding member 56 and the lower holding member 57 were made of silicon nitride ceramics as described in FIG. 3, but the present invention is not limited to this option alone, and it is also acceptable to form only one of the upper holding member 56 and the lower holding member 57 from silicon nitride ceramics.

Obviously, various minor changes and modifications of the present invention are possible in the light of the above teaching. It is therefore to be understood that within the scope of the appended claims the invention may be practiced otherwise than as specifically described.

What is claimed is:

1. A spherical coupling structure for a piston and a connecting rod, used in an internal-combustion engine, comprising:
   a protrusion formed on the reverse side of a crown of the piston and having a bottom surface on which a concave first spherical surface is formed;
   a spherical small end formed on the connecting rod and fitted in the first spherical surface so that the distal end is capable of sliding;
   a holding member having a concave second spherical surface and holding the small end by slidably fitting the portion of the small end that faces the large end in the second spherical surface;
   a first screw formed on the protrusion; and
   a second screw formed on a holding/fastening part for holding the holding member, wherein
   the small end is held by the first spherical surface and the second spherical surface by screwing in the first screw and the second screw; and
   the piston is composed of an upper piston that includes the protrusion and a lower piston that includes the holding/fastening part, and the masses of the upper piston and the lower piston are distributed so as to substantially match each other.

2. The spherical coupling structure of claim 1, wherein the center of the small end substantially coincides with the centroid of the piston.

3. The spherical coupling structure of claim 2, wherein the piston includes a skirt part formed around the periphery.

4. A spherical coupling structure for a piston and a connecting rod, used in an internal-combustion engine, comprising:
   a protrusion formed on the reverse side of a crown of the piston and having a bottom surface on which a concave first spherical surface is formed;
   a spherical small end formed on the connecting rod and fitted in the first spherical surface so that the distal end is capable of sliding;
   a holding member having a concave second spherical surface and holding the small end by slidably fitting the portion of the small end that faces large end in the second spherical surface;
   a first screw formed on the protrusion; and
   a second screw formed on a holding/fastening part for holding the holding member, wherein
   the small end is held by the first spherical surface and the second spherical surface by screwing in the first screw and the second screw;
   the protrusion includes a position-adjustable member whose position can be adjusted within a position-adjusting space formed on the inner side; and
   the first spherical surface is formed in the position-adjustable member.

5. The spherical coupling structure of claim 4, wherein the piston is divided into an upper piston that includes the protrusion and a lower piston that includes the holding/fastening part.

6. The spherical coupling structure of claim 5, wherein at least one of the position-adjustable member and the holding member is made of ceramics.

* * * * *